United States Patent
Oyamada

(10) Patent No.: US 8,121,453 B2
(45) Date of Patent: Feb. 21, 2012

(54) OPTICAL FIBER

(75) Inventor: Hiroshi Oyamada, Gunma (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 121 days.

(21) Appl. No.: 12/782,459

(22) Filed: May 18, 2010

(65) Prior Publication Data

US 2010/0296783 A1 Nov. 25, 2010

(30) Foreign Application Priority Data

May 20, 2009 (JP) .................. 2009-121725

(51) Int. Cl.
*G02B 6/26* (2006.01)
(52) U.S. Cl. ........... 385/126; 385/123; 385/141
(58) Field of Classification Search .......... 385/123, 385/124, 126, 127, 128, 141
See application file for complete search history.

(56) References Cited

U.S. PATENT DOCUMENTS

| 2003/0026566 A1* | 2/2003 | Diep et al. ............ 385/123 |
| 2004/0033039 A1 | 2/2004 | Oliveti et al. |
| 2004/0136668 A1* | 7/2004 | Takahashi et al. ......... 385/123 |
| 2006/0039665 A1 | 2/2006 | Matsuo et al. |
| 2008/0056658 A1 | 3/2008 | Bickham et al. |
| 2010/0296783 A1* | 11/2010 | Oyamada ............ 385/126 |

FOREIGN PATENT DOCUMENTS

| EP | 2253974 A1 * | 11/2010 |
| EP | 2253975 A1 * | 11/2010 |
| JP | 2002-47027 A | 2/2002 |
| JP | 2004-508600 A | 3/2004 |
| JP | 2006-133496 A | 5/2006 |
| WO | 2008027336 A1 | 3/2008 |

OTHER PUBLICATIONS

Kawakami et al., "Characteristics of a Doubly Clad Optical Fiber with a Low-Index Inner Cladding", IEEE Journal of Quantum Electronics, Dec. 1974, vol. QE-10, No. 12, pp. 879-887.
U.S. Appl. No. 12/782,487, filed May 18, 2010.
European Search Report dated Oct. 6, 2010, in a counterpart European patent application No. 10163343.6.

* cited by examiner

*Primary Examiner* — Brian Healy
(74) *Attorney, Agent, or Firm* — Chen Yoshimura LLP

(57) ABSTRACT

Provided is an optical fiber including: a first core at a center thereof; a second core adjacent to the first core to cover a circumference of the first core; a third core adjacent to the second core to cover a circumference of the second core; and a cladding adjacent to the third core to cover a circumference of the third core, where conditions of $0.28\% \leq \Delta_1 \leq 0.4\%$, $-0.05\% \leq \Delta_2 \leq 0.05\%$, $-1.0\% \leq \Delta_3 \leq -0.5\%$, $3.8\ \mu m \leq a \leq 4.5\ \mu m$, $12\ \mu m \leq b \leq 21\ \mu m$, and $1.5\ \mu m \leq c-b \leq 10\ \mu m$ hold, and loss increase resulting when the optical fiber is wound on a mandrel having a diameter of 20 mm is 0.1 dB/turn or smaller at a wavelength of 1625 nm, where $\Delta_1$ is a specific refractive index difference of the first core from the cladding refractive index, $\Delta_2$ is a specific refractive index difference of the second core from the cladding refractive index, $\Delta_3$ is a specific refractive index difference of the third core from the cladding refractive index, "a" is a radius of a boundary between the first core and the second core with respect to a center of the first core, "b" is a radius of a boundary between the second core and the third core with respect to the center of the first core, and "c" is a radius of a boundary between the third core and the cladding with respect to the center of the first core.

16 Claims, 7 Drawing Sheets

OPTICAL FIBER

The contents of the following patent application is incorporated herein by reference, NO. 2009-121725 filed on May 20, 2009.

BACKGROUND

1. Technical Field

The present invention relates to an optical fiber for optical communication, and particularly relates to an optical fiber suitable as a long distance line and Optical Fiber To The Home (FTTH) having transmission length of some tens of kilometers, and interconnection inside or outside homes in local area networks (LAN).

2. Related Art

Optical fibers are suitable for long distance communication for their wide band characteristics, and are widely used for communication in main lines of a long distance such as some tens of kilometers and above.

On the other hand, with rapid prevalence of the Internet, the amount of information transceived by individual personal computers has also increased dramatically. The widely used technology in this field has been copper electric cables such as a coaxial cable and an unshielded twisted pair (UTP) cable. Such electric cables, however, have a narrow band and so are easily affected by the electromagnetic wave noise, and so cannot easily transmit a large amount of information.

As a solution, as a technology capable of increasing the transmission capacity, FTTH has started to prevail, which uses an optical fiber also in communication between each user and a telephone station, not only to long distance communication between telephone stations. Utilizing wide band characteristics of optical fibers, The FTTH technology adopts such a system in which a single line of optical fiber is shared among a plurality of users of a group up to the vicinity of the group, and an optical signal is branched for each user and an extension of optical fiber is distributed to each user.

There are various types of optical fibers, among which a single mode optical fiber of ITU-T G. 650 standard is mainly used for long distance communication. This type of optical fiber has a small transmission loss, and comparatively cheap. The cutoff wavelength of it is about 1300 nm or below such that the signals of 1300 nm band are in the single mode. Moreover, the mode field diameter (MFD) of it is normally in the range of about 9-10 µm so as to restrain the optical nonlinearity, as opposed to the MFD rating of about 8-10 µm.

The FTTH also uses a similar type of single mode optical fiber, in which an extension is drawn into the home of each user from a branch point. This is because if optical fibers widely different in MFD are connected to each other, it would cause transmission loss. Another important requirement of intra-home interconnection is bending loss. Long distance main line cables are laid in underground ducts unsusceptible to external force, and so the bending force exerted on the optical fiber main body can be assumed to correspond to only winding of a diameter of 60 mm within a terminal container (100 times at most). As opposed to this, inside and outside homes, the interconnection is pursued in the state of relatively thin codes (diameter of some millimeters) so as to be flexible and light, which is susceptible to outer force and the bending radius on the optical fiber often becomes 20 mm or smaller.

An optical fiber inherently has a characteristic of propagating signal light along a core of the optical fiber, and so being capable of transmission even in the bent state. However as the bending radius becomes small, the ratio of leak of unpropagated light from the core increases in an exponential fashion, to cause transmission loss. This is referred to as bending loss. So as to reduce the bending loss, it is effective to focus light to the core as much as possible, which is realized by reducing the MFD. With this in view, normally an optical fiber having MFD of about 6-8 µm is used, to realize bending loss of about 0.5 dB/turn at the wavelength of 1550 nm, when wound around a mandrel (cylinder) having a diameter of 20 mm for example.

However, connection loss is large when an optical fiber having MFD of about 6 µm is connected to an optical fiber having MFD of about 10 µm, and so the main line and the user line should operate in single mode optical fiber systems separate from each other. One way to solve this problem is to enlarge the cutoff wavelength. With the same MFD, the bending loss decreases in an exponential fashion as the cutoff wavelength increases. Even if the fiber cutoff wavelength defined by ITU-T G.650 is 1350 nm, the cable cutoff wavelength is generally about 1250 nm, which is about 100 nm shorter than the fiber cutoff wavelength, and so it does not pose problems in practical usage in the 1300 nm band. If the MFD is designed to be in the range of about 8-9 µm, which is close to the lower limit of G652, the bending loss will be alleviated.

The bending loss can also be reduced by using a double clad optical fiber having a small inner cladding refractive index while enlarging the MFD, as reported such as in Shojiro Kawakami and Shigeo Nishida, "Characteristics of a Doubly Clad Optical Fiber with a Low-Index Inner Cladding," IEEE Journal of Quantum Electronics, vol. QB-10, No. 12, pp. 879-887, Dec. 1974. An optical fiber having a reduced impurity absorption loss and an optimized zero-dispersion wavelength by adopting the mentioned structure is disclosed in Japanese Patent Application Publication No. 2002-47027. With this technology, a specific refractive index difference of a low reflactive cladding is set to be about −0.021 to −0.0007%, and an MFD is set to be about 9.2 µm. Japanese Patent Application Publication No. 2006-133496 also discloses an optical fiber having an improved bending characteristic. Using this technology, the low refractive index cladding is further reduced to be in the range of −0.08 to −0.02%, and the MFD is designed to be a slightly smaller, such as in the range of 8.2 to 9.0 µm.

On the other hand, a technology of providing interconnection using an optical fiber between electronic appliances has started to prevail. A representative LAN communication standard IEEE 802.3 lists various types of optical fibers. Laser optical sources and optical receivers used in the wavelength of 1300 nm band are comparatively expensive, and so cheaper light emitting diodes (LED) and a surface emitting lasers (VCSEL) in the 850 nm band are often used. The optical fibers used for this purpose is a multimode optical fiber, which typically has a core diameter of 50 µm. The multimode optical fiber generally has different light propagation speed for each mode, and so has a parabolic shaped refractive index distribution ($\alpha$ type), instead of a simple step-like refractive index distribution, to reduce the difference in light propagation speed between modes. Such a device realizes a propagation speed of 500 MHz/km for example.

For the purpose of using an optical fiber having a common specification in such usages as the long distance transmission path, the FTTH, and LAN, Japanese Patent Application Publication (translation of PCT application) No. 2004-508600 discloses designing the core's refractive index distribution in substantially $\alpha$ shape, to reduce the mode delay in the 850 nm band to guarantee its usage in the 850 nm band. However, it fails to mention bending loss in a smaller diameter (e.g. about 20 mm).

SUMMARY

Therefore, it is an object of an aspect of the innovations herein to provide an optical fiber, which is capable of overcoming the above drawbacks accompanying the related art. The above and other objects can be achieved by combinations described in the independent claims. The dependent claims define further advantageous and exemplary combinations of the innovations herein.

In view of the above-described prior art, the present invention aims to provide an optical fiber having MFD conforming to G652 standard (preferably 9 μm or above), improved bending characteristics, as well as providing an optical fiber capable of operating in a single mode at 1310 nm and having a wide transmission band.

So as to solve the above-stated problem, according to a first aspect related to the innovations herein, provided is an optical fiber including: a first core at a center thereof; a second core adjacent to the first core to cover a circumference of the first core; a third core adjacent to the second core to cover a circumference of the second core; and a cladding adjacent to the third core to cover a circumference of the third core, wherein conditions of $0.28\% \leq \Delta_1 \leq 0.4\%$, $-0.05\% \leq \Delta_2 \leq 0.05\%$, $-1.0\% \leq \Delta_3 \leq -0.5\%$, $3.8 \ \mu m \leq a \leq 4.5 \ \mu m$, $12 \ \mu m \leq b \leq 21 \ \mu m$, and $1.5 \ \mu m \leq c-b \leq 10 \ \mu m$ hold, and loss increase resulting when the optical fiber is wound on a mandrel having a diameter of 20 mm is 0.1 dB/turn or smaller at a wavelength of 1625 nm, where $\Delta_1$ is a specific refractive index difference of the first core from the cladding refractive index, $\Delta_2$ is a specific refractive index difference of the second core from the cladding refractive index, $\Delta_3$ is a specific refractive index difference of the third core from the cladding refractive index, "a" is a radius of a boundary between the first core and the second core with respect to a center of the first core, "b" is a radius of a boundary between the second core and the third core with respect to the center of the first core, and "c" is a radius of a boundary between the third core and the cladding with respect to the center of the first core.

The optical fiber having the stated structure may have a mode field diameter in an LP01 mode at a wavelength of 1310 nm is in a range of 8 μm to 10 μm, inclusive. The fiber cutoff wavelength measured for the optical fiber having a length of 2 m defined in ITU-T G. 650 standard may be 1650 nm or below, and a cable cutoff wavelength measured for the optical fiber having a length of 22 m defined in ITU-T G. 650 standard is 1450 nm or below. The fiber cutoff wavelength may be 1430 nm or below, and the cable cutoff wavelength may be 1300 nm or below. The difference between a fiber cutoff wavelength and a cable cutoff wavelength may be 120 nm or above, and a signal propagated in the optical fiber having a length of 1 km may be substantially in a single mode. The transmission band measurement value measured for the optical fiber having a length of 1 km at a wavelength of 1310 nm may be 2 GHz/km or above. Zero-dispersion wavelength may be in a range of 1290 nm to 1345 nm, inclusive. Furthermore, a difference in propagation time between an LP01 mode signal and an LP11 mode signal which are propagated synchronously may be 20 picoseconds or below at a wavelength of 1310 nm per 1 m of the optical fiber, and a difference in propagation time between an LP01 mode signal and an LP02 mode signal which are propagated synchronously may be 20 picoseconds or below at a wavelength of 1310 nm per 1 m of the optical fiber. The transmission loss at a wavelength of 1383 nm may be 0.4 dB/km or below. Note that the first core may have an a shape or α step-like formation, and the radius "b" may be 1.8 times or more of a mode field diameter.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Some aspects of the invention will now be described based on the embodiments, which do not intend to limit the scope of the present invention, but exemplify the invention. All of the features and the combinations thereof described in the embodiment are not necessarily essential to the invention.

Embodiment Example 1

Figure 1:
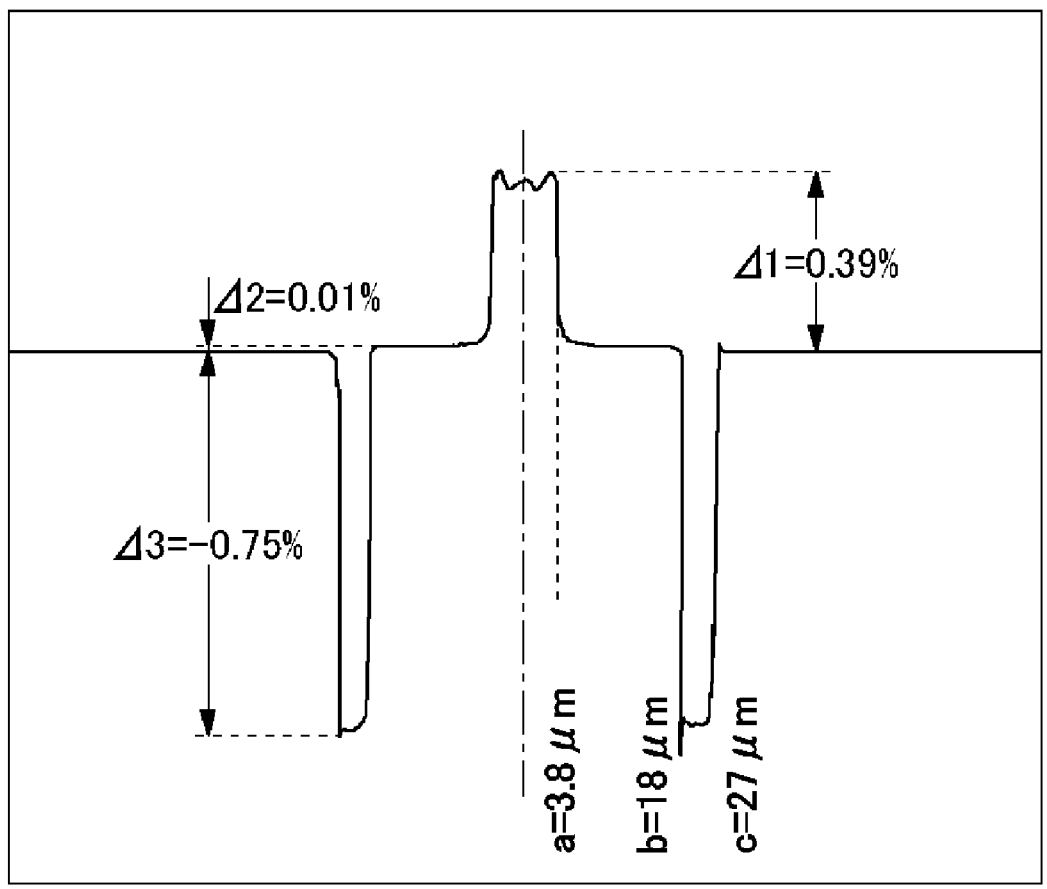
FIG. 1 is a diagram explaining a refractive index distribution of an optical fiber manufactured in Embodiment Example 1.

FIG. 1 shows a refractive index distribution of an optical fiber manufactured in the present Embodiment Example 1.

First, a first core shown in the drawing is manufactured using a VAD method, which is then stretched into a desired diameter to produce a core material, to which a second core is provided at an exterior of the core material. Further thereon, fluorine is added to form a third core having a refractive index lower than a silica level, onto which, a clad is added, to manufacture an optical fiber base material. This base material is drawn to create an optical fiber having a cladding diameter of 125 μm, which is then coated with urethane acrylate, thereby obtaining an optical fiber wire having a diameter of 250 μm.

In this optical fiber, the radius of the first core "a" is 3.8 μm, the radius of the second core "b" is 18 μm, and the radius of the third core "c" is 27 μm (the third core having a smaller refractive index). Moreover, the maximum $\Delta_1$ of the specific refractive index difference of the first core is 0.39%, the maximum $\Delta_2$ of the specific refractive index difference of the second core is 0.01%, and the minimum $\Delta_3$ of the specific refractive index difference of the third core is -0.75%.

The optical fiber having the stated configuration has a fiber cutoff wavelength of 1417 nm and a cable cutoff wavelength of 1276 nm, meaning that the difference therebetween is 141 nm, which confirms single mode operation at the wavelength of 1310 nm. The MFD at 1310 nm is 9.21 μm, the zero-dispersion wavelength is 1321 nm, and the zero-dispersion slope is 0.085 ps/nm²/km. The loss increase resulting when this optical fiber is wound on the cylinder having a diameter of 20 mm was 0.05 dB/turn.

Figure 2:
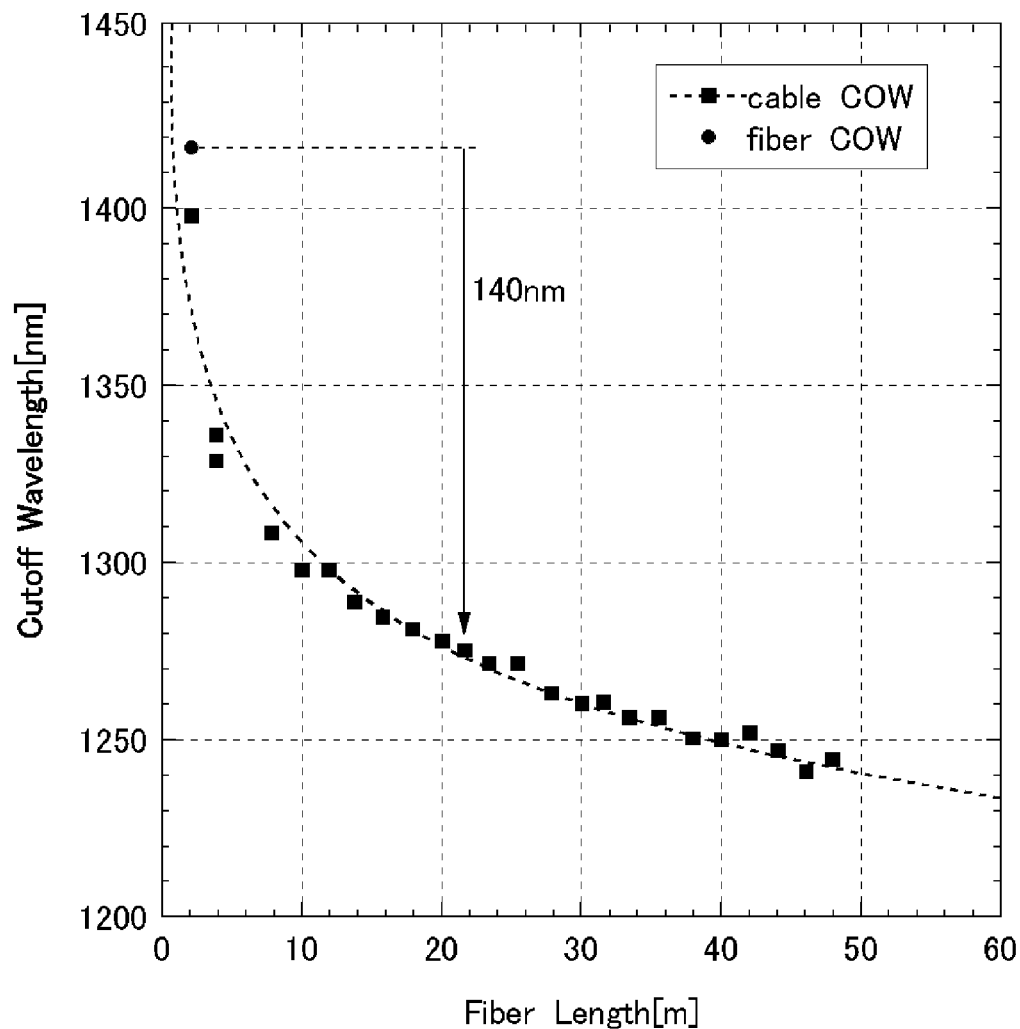
FIG. 2 shows a relation between a cutoff wavelength and a fiber length of the optical fiber manufactured in Embodiment Example 1.

FIG. 2 shows a relation between a cutoff wavelength and a fiber length of the optical fiber. This drawing shows that the cutoff wavelength becomes shorter as the increase in fiber length, and when exceeding 10 m, the optical fiber is shown to operate substantially in a single mode at the wavelength of 1310 nm.

Figure 3:
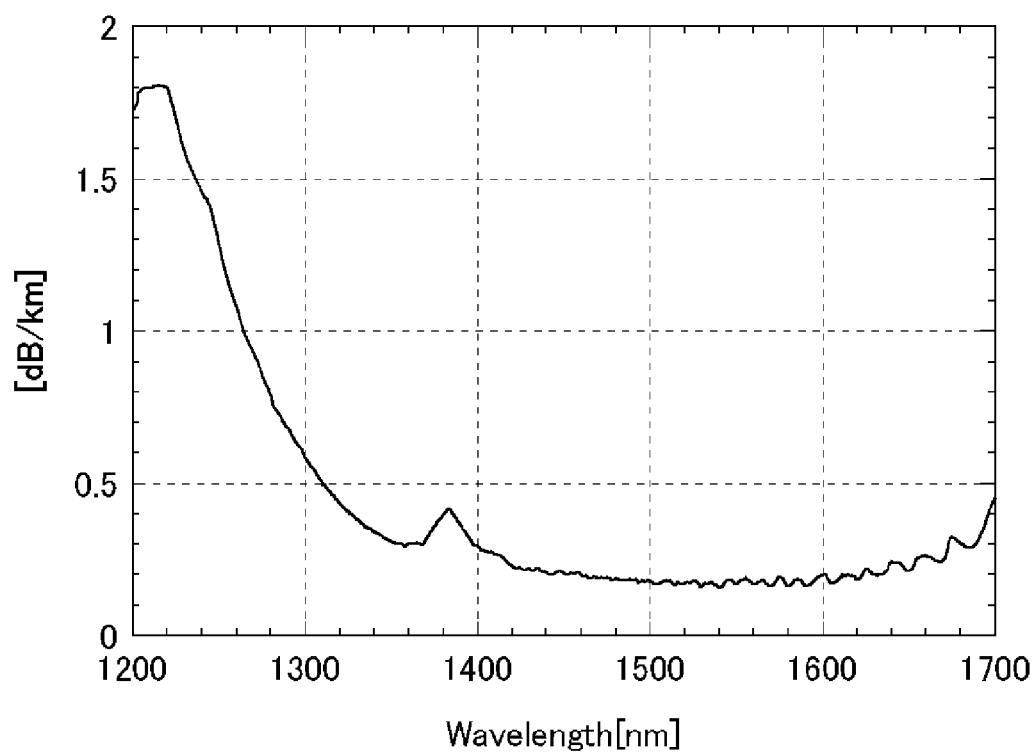
FIG. 3 shows a relation between a wavelength and a transmission loss of the optical fiber manufactured in Embodiment Example 1.

Next, the transmission loss is measured, and FIG. 3 shows the result. The transmission loss at the wavelength of 1383 nm is 0.42 dB/km, which shows that as a result of having the second core layer (radius "b") of 18 μm, which is about 1.9 times larger than the MFD, the loss due to OH group contained in the vicinity of the third core layer (radius "c") is reduced.

Embodiment Example 2

A surface of the optical fiber base material manufactured in Embodiment Example 1 is scraped off, which is then drawn to manufacture an optical fiber having a cladding diameter of 125 μm, which is then coated with urethane acrylate, thereby obtaining an optical fiber wire having a diameter of 250 μm.

The specific refractive index differences $\Delta_1$, $\Delta_2$, and $\Delta_3$ for the respective cores of the manufactured optical fiber are the same as those in Embodiment Example 1, except that the radius of each core is 1.15 times larger than in the case of Embodiment Example 1. Specifically, the radius of the first core "a" is 4.4 μm, the radius of the second core "b" is 21 μm, and the radius of the third core "c" is 31 μm.

Figure 4:
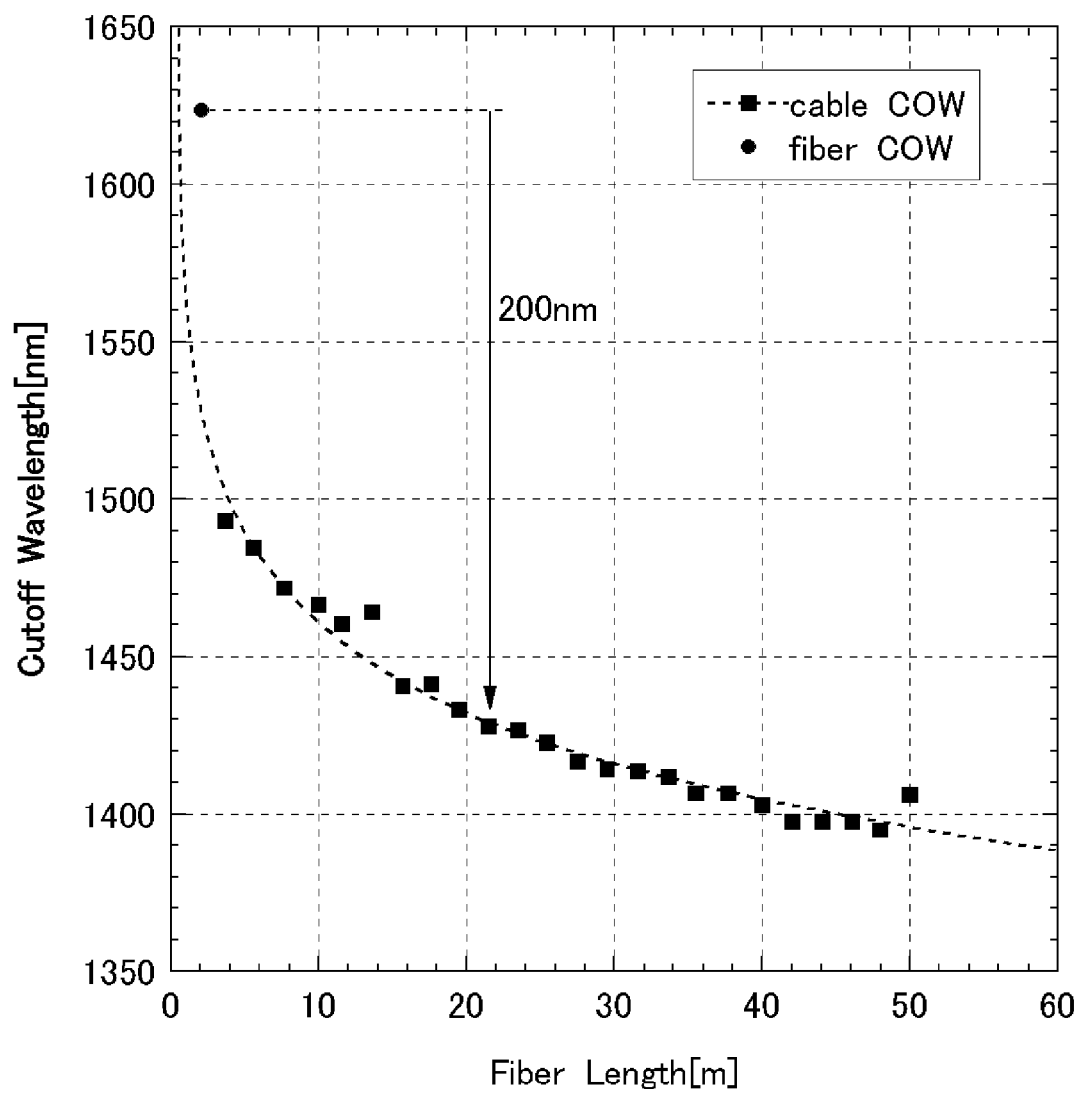
FIG. 4 shows a relation between a cutoff wavelength and a fiber length of the optical fiber manufactured in Embodiment Example 2.

FIG. 4 shows a relation between the cutoff wavelength and the fiber length. The drawing shows that the fiber cutoff wavelength is 1625 nm and the cable cutoff wavelength is 1430 nm, meaning that the difference therebetween is 195 nm.

Figure 5:
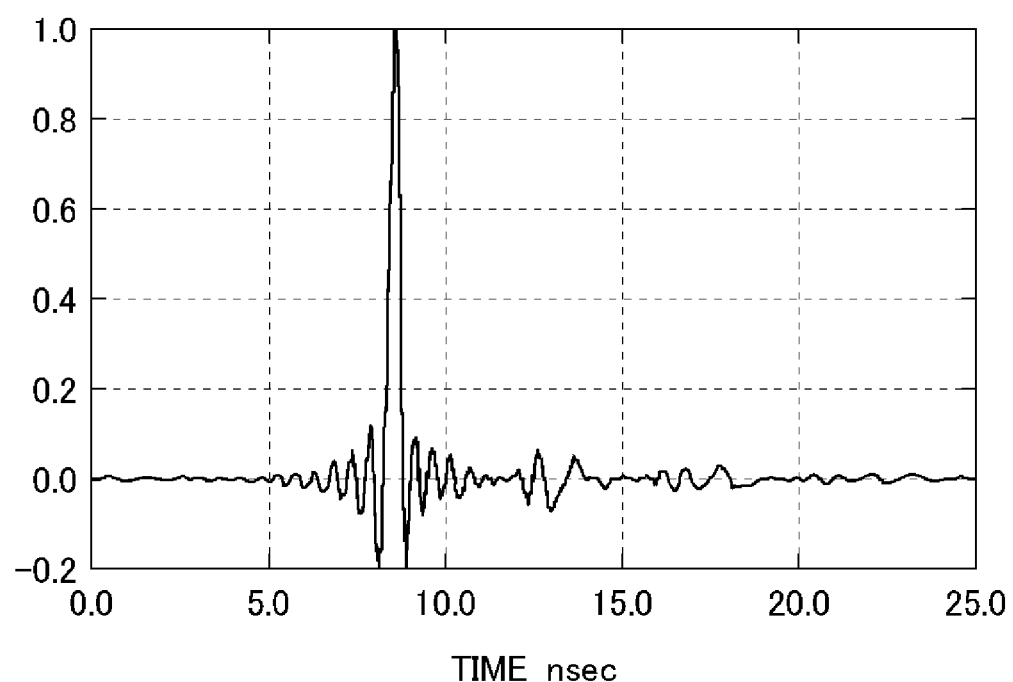
FIG. 5 shows an impulse response.

Using an optical fiber having a length of 5 km, the transmission band at the wavelength of 1310 nm was measured as 3000 MHz/km, and the impulse response was as shown in FIG. 5, which confirms single mode operation at the wavelength of 1310 nm. Furthermore, the MFD at 1310 nm is 9.74 μm, the zero-dispersion wavelength is 1301 nm, and the zero-dispersion slope is 0.087 ps/nm²/km. The loss increase resulting when this optical fiber is wound on the cylinder having a diameter of 20 mm was 0.01 dB/turn. The transmission loss at the wavelength of 1383 nm was 0.345 dB/km.

Note that by further precisely adjusting the cladding thickness to lie between Embodiment Example 1 and Embodiment Example 2, the zero-dispersion wavelength can be designed to be 1310 nm for example.

Embodiment Example 3

Figure 6:
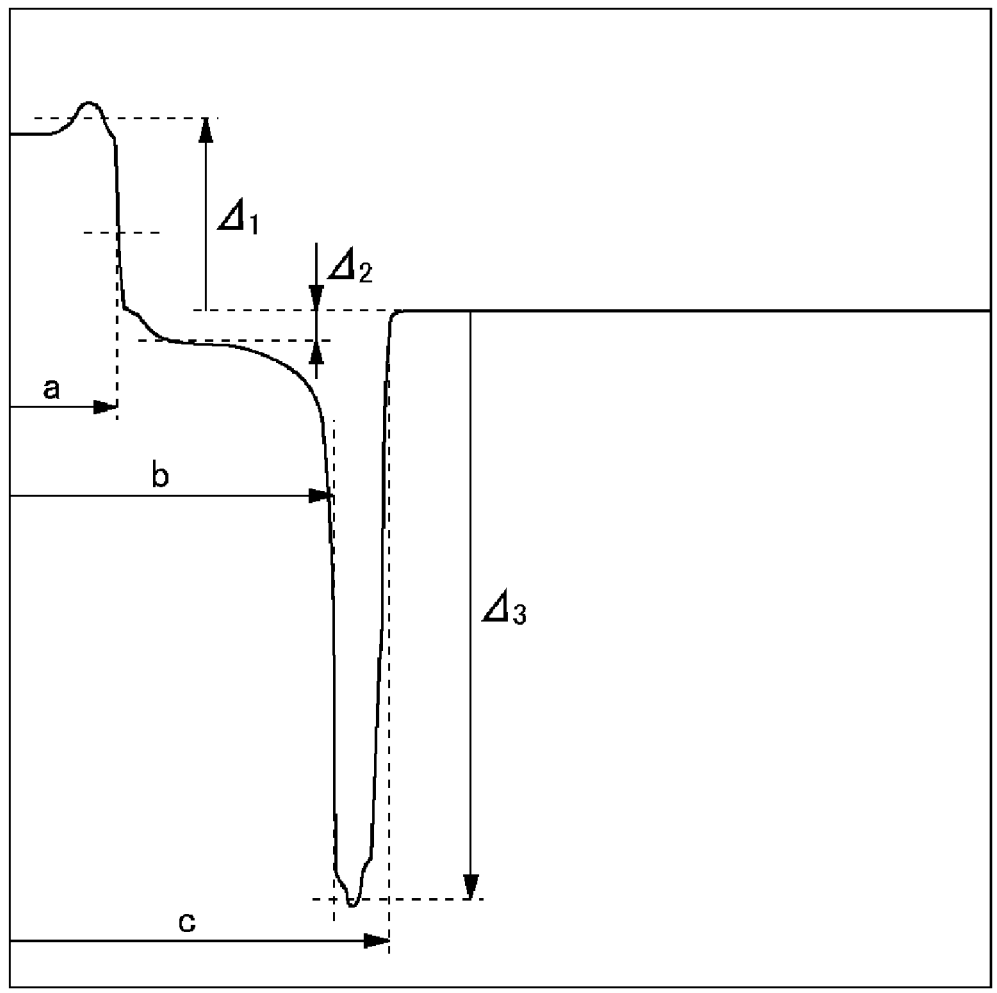
FIG. 6 shows a refractive index distribution of an optical fiber base material manufactured in Embodiment Example 3.

A porous glass base material integrating a first core and a second core is manufactured using a VAD method, vitrified into a transparent glass, which is then stretched into a desired diameter to produce a core material. Further thereon, fluorine is added by providing porous glass at an exterior, to form a third core having a refractive index lower than a silica level, onto which, a clad is added, to manufacture an optical fiber base material. FIG. 6 shows a result of measuring the refractive index distribution of the base material using a commercially available preform analyzer.

This base material is drawn to create an optical fiber having a cladding diameter of 125 μm, which is then coated with urethane acrylate, thereby obtaining an optical fiber wire having a diameter of 250 μm. Thus obtained optical fiber has a diameter smaller than that of the base material while maintaining a similar shape to the shape of the base material, and so its refractive index distribution will be the same as that of the base material, except for the dimension in the radius direction.

In this optical fiber, the radius of the first core "a" is 4.2 μm, the radius of the second core "b" is 12.5 μm, and the radius of the third core "c" is 14.3 μm (the third core having a smaller refractive index). Moreover, the average $\Delta_1$ of the specific refractive index difference of the first core is 0.28%, the average $\Delta_2$ of the specific refractive index difference of the second core is −0.05%, and the minimum $\Delta_3$ of the specific refractive index difference of the third core is −0.88%. Note that the value $\Delta_1$ was obtained by averaging the refractive indices inner than the radius position at which the refractive index of the first cores takes the maximal value, and the value $\Delta_2$ was obtained by averaging the refractive indices between "a" and "b" for the second core, and the value $\Delta_3$ was obtained by averaging the refractive indices between "b" and "c" for the third core in the radius direction. In addition, "a" is set at a position corresponding to a half width of $\Delta_1$ of the first core, and "b" is set at a position where the refractive index distribution in the boundary between the second core and the third core becomes the most precipitous, and "c" is set at a position where the refractive index in the boundary between the third core and the cladding becomes the most precipitous (refer to FIG. 6).

This optical fiber has a fiber cutoff wavelength of 1310 nm and a cable cutoff wavelength of 1269 nm, which confirms substantial single mode operation at the wavelength of 1310 nm. The MFD at 1310 nm is 9.61 μm, the zero-dispersion wavelength is 1308 nm, and the zero-dispersion slope is 0.089 ps/nm²/km. The loss increase resulting when this optical fiber is wound on the cylinder having a diameter of 20 mm was 0.055 dB/turn at the wavelength of 1625 nm. Note that the transmission loss at the wavelength of 1383 nm was 0.342 dB/km.

Comparison Example 1

Figure 7:
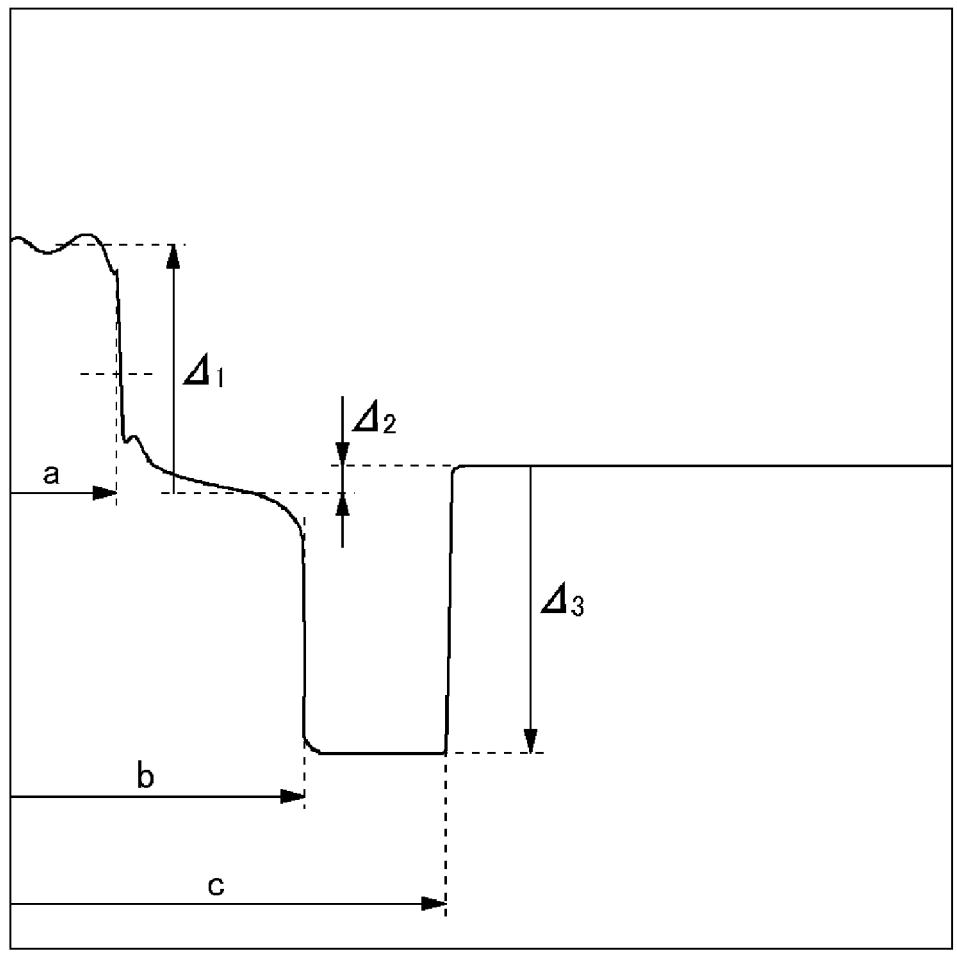
FIG. 7 shows a refractive index distribution of an optical fiber base material manufactured in Comparison Example 1.

A porous glass base material integrating a first core and a second core is manufactured using a VAD method, vitrified into a transparent glass, which is then stretched into a desired diameter to produce a core material. Further thereon, fluorine is added by providing porous glass at an exterior, to form a third core having a refractive index lower than a silica level, onto which, a clad is added, to manufacture an optical fiber base material. FIG. 7 shows a result of measuring the refractive index distribution of the base material using a commercially available preform analyzer.

This base material is drawn to create an optical fiber having a cladding diameter of 125 μm, which is then coated with urethane acrylate, thereby obtaining an optical fiber wire having a diameter of 250 μm. Thus obtained optical fiber has a diameter smaller than that of the base material while maintaining a similar shape to the shape of the base material, and so its refractive index distribution will be the same as that of the base material, except for the dimension in the radius direction.

In this optical fiber, the radius of the first core "a" is 3.5 μm, the radius of the second core "b" is 9.6 μm, and the radius of the third core "c" is 14.2 μm (the third core having a smaller refractive index). Moreover, the average $\Delta_1$ of the specific refractive index difference of the first core is 0.32%, the average $\Delta_2$ of the specific refractive index difference of the second core is −0.05%, and the minimum $\Delta_3$ of the specific refractive index difference of the third core is −0.42%. Note that the value $\Delta_1$ was obtained by averaging the refractive indices inner than the radius position at which the refractive index of the first cores takes the maximal value, and the value $\Delta_2$ was obtained by averaging the refractive indices between "a" and "b" for the second core, and the value $\Delta_3$ was obtained by averaging the refractive indices between "b" and "c" for the third core in the radius direction. In addition, "a" is set at a position corresponding to a half width of $\Delta_1$ of the first core, and "b" is set at a position where the refractive index distribution in the boundary between the second core and the third core becomes the most precipitous, and "c" is set at a position where the refractive index in the boundary between the third core and the cladding becomes the most precipitous (refer to FIG. 7).

This optical fiber has a fiber cutoff wavelength of 1205 nm and a cable cutoff wavelength of 1115 nm, which confirms substantial single mode operation at the wavelength of 1310 nm. The MFD at 1310 nm is 8.87 μm, the zero-dispersion wavelength is 1327 nm, which is larger than G652 standard. The zero-dispersion slope is 0.087 ps/nm²/km. The loss increase resulting when this optical fiber is wound on the cylinder having a diameter of 20 mm was 0.15 dB/turn at the wavelength of 1625 nm, which shows a slightly large bending loss. Note that the transmission loss at the wavelength of 1383 nm was 0.964 dB/km.

As clear from the above explanation, according to the above-stated configuration, the embodiment examples of the present invention can easily obtain an optical fiber that has various advantageous such as having MFD conforming to G652 standard (particularly 9 μm or above), improved bending loss, capable of operating in a single mode at 1310 nm despite of large cutoff wavelength, having a wide transmission band as well as a desirable zero-dispersion wavelength.

Communication characteristics improve by using an optical fiber according to the present invention.

Although some aspects of the present invention have been described by way of exemplary embodiments, it should be understood that those skilled in the art might make many changes and substitutions without departing from the spirit and the scope of the present invention which is defined only by the appended claims.

What is claimed is:

1. An optical fiber comprising:
   a first core at a center thereof;
   a second core adjacent to the first core to cover a circumference of the first core;
   a third core adjacent to the second core to cover a circumference of the second core; and
   a cladding adjacent to the third core to cover a circumference of the third core, wherein conditions of $0.28\% \leq \Delta_1 \leq 0.4\%$, $-0.05\% \leq \Delta_2 \leq 0.05\%$, $-1.0\% \leq \Delta_3 \leq -0.5\%$, $3.8\ \mu m \leq a \leq 4.5\ \mu m$, $12\ \mu m \leq b \leq 21\ \mu m$, and $1.5\ \mu m \leq c-b \leq 10\ \mu m$ hold, and loss increase resulting when the optical fiber is wound on a mandrel having a diameter of 20 mm is 0.1 dB/turn or smaller at a wavelength of 1625 nm, where $\Delta_1$ is a specific refractive index difference of the first core from the cladding refractive index, $\Delta_2$ is a specific refractive index difference of the second core from the cladding refractive index, $\Delta_3$ is a specific refractive index difference of the third core from the cladding refractive index, "a" is a radius of a boundary between the first core and the second core with respect to a center of the first core, "b" is a radius of a boundary between the second core and the third core with respect to the center of the first core, and "c" is a radius of a boundary between the third core and the cladding with respect to the center of the first core.

2. The optical fiber according to claim 1, wherein a mode field diameter in an LP01 mode at a wavelength of 1310 nm is in a range of 8 μm to 10 μm, inclusive.

3. The optical fiber according to claim 1, wherein a fiber cutoff wavelength measured for the optical fiber having a length of 2 m defined in ITU-T G. 650 standard is 1650 nm or below.

4. The optical fiber according to claim 1, wherein a cable cutoff wavelength measured for the optical fiber having a length of 22 m defined in ITU-T G. 650 standard is 1450 nm or below.

5. The optical fiber according to claim 1, having a fiber cutoff wavelength of 1430 nm or below.

6. The optical fiber according to claim 1, having a cable cutoff wavelength of 1300 nm or below.

7. The optical fiber according to claim 1, wherein a difference between a fiber cutoff wavelength and a cable cutoff wavelength is 120 nm or above.

8. The optical fiber according to claim 1, wherein a signal propagated in the optical fiber having a length of 1 km is substantially in a single mode.

9. The optical fiber according to claim 8, wherein a transmission band measurement value measured for the optical fiber having a length of 1 km at a wavelength of 1310 nm is 2 GHz/km or above.

10. The optical fiber according to claim 1, having a zero-dispersion wavelength in a range of 1290 nm to 1345 nm, inclusive.

11. The optical fiber according to claim 1, wherein a difference in propagation time between an LP01 mode signal and an LP11 mode signal which are propagated synchronously is 20 picoseconds or below at a wavelength of 1310 nm per 1 m of the optical fiber.

12. The optical fiber according to claim 1, wherein a difference in propagation time between an LP01 mode signal and an LP02 mode signal which are propagated synchronously is 20 picoseconds or below at a wavelength of 1310 nm per 1 m of the optical fiber.

13. The optical fiber according to claim 1, wherein the first core has an α shape.

14. The optical fiber according to claim 1, wherein the first core has a step-like formation.

15. The optical fiber according to claim 1, wherein the radius "b" is 1.8 times or more of a mode field diameter.

16. The optical fiber according to claim 1, wherein a transmission loss at a wavelength of 1383 nm is 0.4 dB/km or below.

* * * * *